US012752384B2

(12) United States Patent
Zanni

(10) Patent No.: US 12,752,384 B2
(45) Date of Patent: Oct. 6, 2026

(54) DEVICE FOR CLAMPING WORKPIECES ON MACHINE TOOLS

(71) Applicant: Hydroblock S.r.l., Reggio Emilia (IT)

(72) Inventor: Davide Zanni, Reggio Emilia (IT)

(73) Assignee: Hydroblock S.r.l., Reggio Emilia (IT)

( * ) Notice: Subject to any disclaimer, the term of this patent is extended or adjusted under 35 U.S.C. 154(b) by 313 days.

(21) Appl. No.: 18/293,393

(22) PCT Filed: Jul. 12, 2022

(86) PCT No.: PCT/IB2022/056412
§ 371 (c)(1),
(2) Date: Jan. 30, 2024

(87) PCT Pub. No.: WO2023/007291
PCT Pub. Date: Feb. 2, 2023

(65) Prior Publication Data

US 2024/0326185 A1 Oct. 3, 2024

(30) Foreign Application Priority Data

Jul. 30, 2021 (IT) ........................ 102021000020684

(51) Int. Cl.
*B23Q 3/08* (2006.01)

(52) U.S. Cl.
CPC .................................... *B23Q 3/082* (2013.01)

(58) Field of Classification Search
CPC ......... B23Q 3/082; B25B 5/166; B25B 5/062; B25B 5/087
See application file for complete search history.

(56) References Cited

U.S. PATENT DOCUMENTS

2002/0135116 A1 9/2002 Dugas et al.
2019/0030686 A1* 1/2019 Zanni ...................... B25B 5/166
2019/0030687 A1* 1/2019 Zanni ...................... B25B 5/062

FOREIGN PATENT DOCUMENTS

| | | |
|---|---|---|
| FR | 2681914 | 4/1993 |
| JP | 08-90103 | 4/1996 |
| JP | 2016-006353 | 1/2016 |
| WO | WO 2023/007291 | 2/2023 |

OTHER PUBLICATIONS

International Search Report and the Written Opinion Dated Oct. 26, 2022 From the International Searching Authority Re. Application No. PCT/IB2022/056412. (9 Pages).

* cited by examiner

*Primary Examiner* — Seahee Hong

(57) ABSTRACT

The device (1) for clamping workpieces on machine tools comprises:

- a basic body (2) provided with a fluid-operated cylinder (3, 4, 5) containing a fluid under pressure;
- a stem (8, 9, 10) comprising an intermediate portion (8), a first end portion (9) and a second end portion (10);
- a clamping bracket (19, 20) associated with the first end portion (9) and movable at least between:
  - a home position; and
  - a work position;
- a first control assembly (25) for controlling the attainment of the work position;
- a second control assembly (36) for controlling the attainment of the home position.

18 Claims, 4 Drawing Sheets

DEVICE FOR CLAMPING WORKPIECES ON MACHINE TOOLS

RELATED APPLICATIONS

This application is a National Phase of PCT Patent Application No. PCT/IB2022/056412 having International filing date of Jul. 12, 2022, which claims the benefit of priority of Italy Patent Application No. 102021000020684 filed on Jul. 30, 2021. The contents of the above applications are all incorporated by reference as if fully set forth herein in their entirety.

FIELD AND BACKGROUND OF THE INVENTION

The present invention relates to a device for clamping workpieces on machine tools.

As is well known, in large-scale production of mechanical workpieces requiring machining with the machine tool, the use is widespread of highly automated systems in which one or more machine tools are electronically controlled by a processing and control unit and one or more anthropomorphic robots bring the workpieces to be machined with the machine tools, where special fastening systems, either of the hydraulic or pneumatic type, take over the workpiece and clamp it in place to allow the machining operation thereof.

When machining is completed, the aforementioned fastening systems release the machined workpiece, which is moved away once again by means of the robots.

One particular type of fastening system consists of a bracket that, by means of a hydraulic or pneumatic drive, is movable either in a rotating mode around an axis of rotation or in a sliding mode along the same axis of rotation.

The bracket is mounted cantilevered on the stem of a hydraulic/pneumatic actuator partly inserted into a fluid-operated cylinder.

Between the stem and the cylinder there are roto-translation means, that is, special constraining means that allow the stem, and thus the bracket mounted thereon, to roto-translate.

Such fastening systems must be capable of exerting even very large clamping forces on the workpiece to be machined.

This need is particularly felt, for example, in the automotive industry, wherein the continuing need to optimize production cycles has led to the use of tools operating at very high speeds, unloading huge forces and vibrations onto the workpiece that must be offset by the fastening systems.

Still in the automotive sector, moreover, it is becoming increasingly common to use particularly lightweight materials such as aluminum, which, however, during machining on the machine tool are unable to provide the same strength as materials such as cast iron and steel.

Therefore, it is necessary that the workpiece clamping bracket, in addition to exerting a very high force, rests on the workpiece at predetermined points, with great precision and in a repeatable manner whenever a new workpiece to be machined is mounted on the machine tool; otherwise, in fact, the great force exerted by the bracket can cause the workpieces to deform, which can compromise the quality of the machining operation and risk of obtaining out-of-tolerance workpieces.

In this regard, it is easy to understand that in systems with a high level of automation, the degree of operational reliability of each component, including the workpieces fastening systems, is usually very high.

Nonetheless, it sometimes happens that the mechanical workpieces to be machined are not placed correctly and accurately and the fastening systems fail to immobilize the workpiece perfectly (or do so but in the wrong position), thus risking compromising the entire machining process and damaging the workpiece and/or machining tools and/or fastening systems.

Similar problems can also occur when unloading the workpiece at the end of the machining process; in fact, in the event that the fastening systems do not fully and correctly release the machined workpiece, the workpiece handling robot picks up (or tries to pick up) a workpiece that is not perfectly released, with the risk of seriously damaging the workpiece and/or the fastening systems and/or the robot itself.

In this context, it is emphasized that, in highly automated plants, any malfunction that results in the stoppage of machining easily turns into a loss of production or, even worse, damage to the systems, and consequent economic damage of non-negligible magnitude.

To partly remedy this problem, some known type of fastening systems involve the use of a closure control valve that, by means of a probe, detects the actual attainment of the clamping configuration by the bracket, so as to provide the machine tool's processing and control unit with the information that the fastening system is located in the workpiece's machining position and machining of the workpiece can actually begin safely.

Such a closure control valve, however, is totally ineffective in detecting the configuration of complete release of the workpiece and, therefore, does not provide any help and cannot solve the above-mentioned problems that may occur during the unloading phase of the workpiece at the end of the machining operation.

Added to this is the fact that the conditions under which the fastening systems of known type must operate are often very complex; the spaces on board conventional machine tools are generally very small and not even all of them exploitable, since some areas of them are subject to the accumulation of condensation, dirt, rust and other erosive agents, so much so that in some circumstances even traditional protective galvanizing coatings do not last long. It is for this reason, therefore, that conventional fastening systems must inconveniently have very small size, and it is always quite complex and difficult to provide them with additional components to improve the performance thereof.

In light of the above, it is easy to understand how the fastening systems of known type are susceptible to refinements.

SUMMARY OF THE INVENTION

The main aim of the present invention is to devise a device for clamping workpieces on machine tools which allows avoiding the performance of mechanical machining on workpieces that are not properly placed and clamped on the machine tool and, at the same time, avoiding the unloading of workpieces that are not perfectly released at the end of machining.

Another object of the present invention is to devise a device for clamping workpieces on machine tools with high reliability and precision of operation.

Not the least object of the present invention is to devise a device for clamping workpieces on machine tools which allows avoiding unwanted malfunction and damage to the workpiece being machined and/or to the tools of the machine tool and/or to the workpiece handling robot and/or to the clamping device itself.

Still another object of the present invention is to devise a device for clamping workpieces on machine tools which has small sizes and can be mounted with remarkable ease on conventional machine tools.

A further object of the present invention is to devise a device for clamping workpieces on machine tools that can overcome the aforementioned drawbacks of the prior art within the framework of a simple, rational, easy and effective to use as well as cost-effective solution.

The above objects are achieved by this device for clamping workpieces on machine tools having the characteristics of claim 1.

BRIEF DESCRIPTION OF THE SEVERAL VIEWS OF THE DRAWINGS

Other characteristics and advantages of the present invention will become more apparent from the description of a preferred, but not exclusive, embodiment of a device for clamping workpieces on machine tools, illustrated by way of an indicative, yet non-limiting example, in the accompanying tables of drawings in which.

DESCRIPTION OF SPECIFIC EMBODIMENTS OF INVENTION

Figure 1:
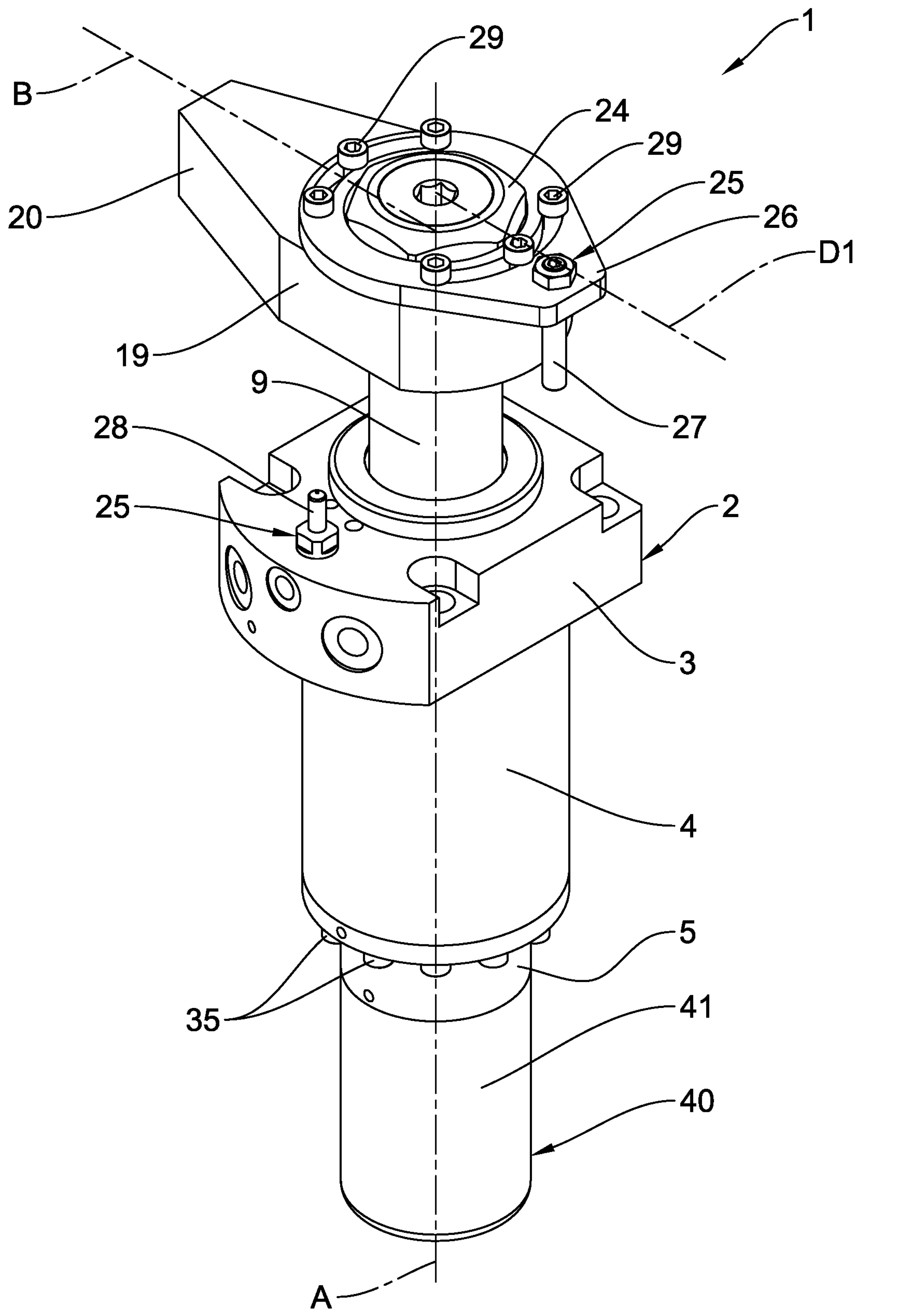
FIG. 1 is an axonometric view of the device according to the invention.
Figure 2:
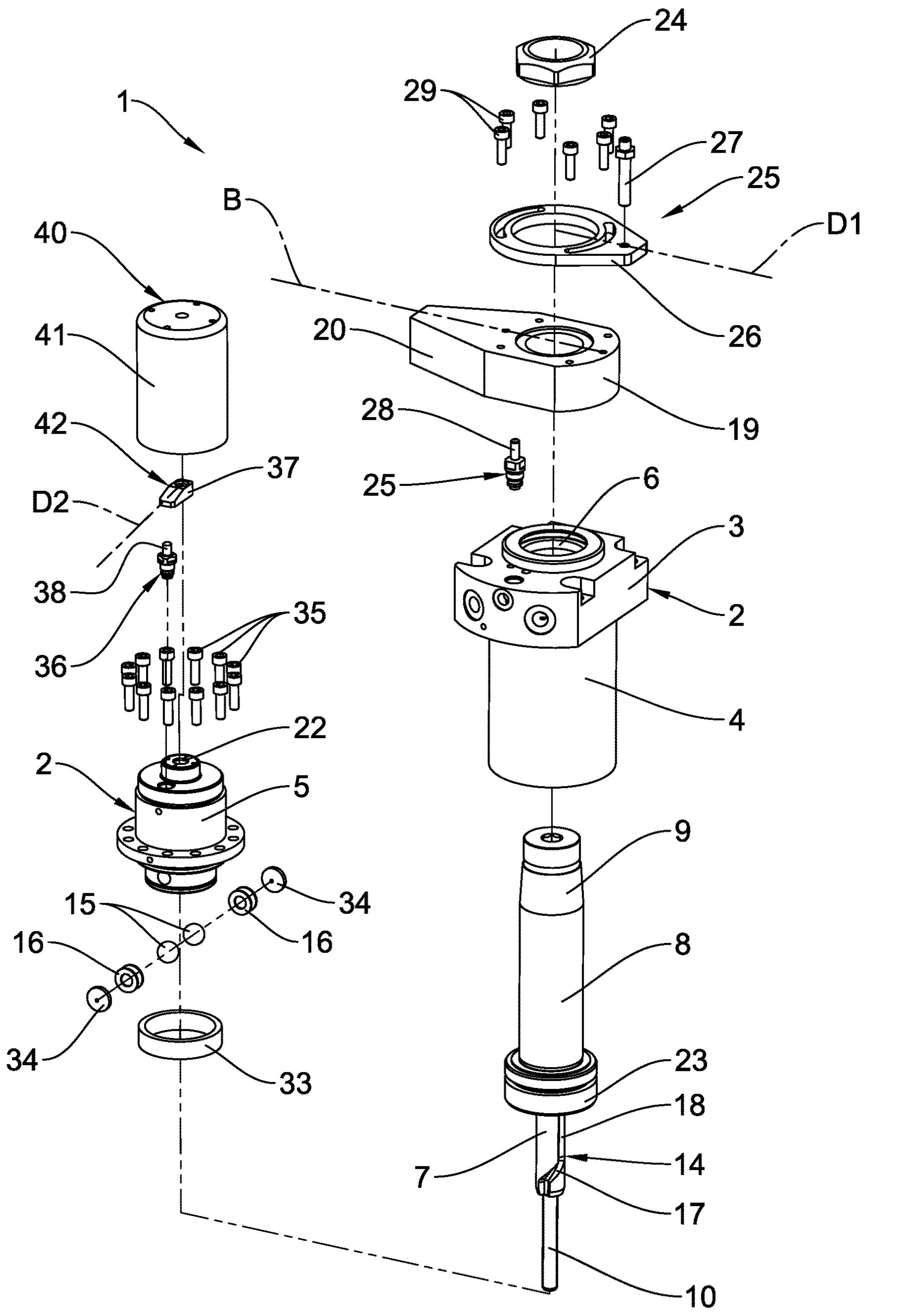
FIG. 2 is an exploded view of the device according to the invention.

With particular reference to these figures, reference numeral 1 globally indicates a device for clamping workpieces on machine tools.

The device 1, in particular, is intended to clamp a workpiece P after it has been placed on a worktop L of a machine tool M and before machining begins.

The worktop L, in actual facts, divides the space on board the machine tool M into a first volume V1, which represents the area in which the workpiece P is placed and in which mechanical machining operations are performed, and a second volume V2, which represents the area inside the machine tool M which is generally inaccessible during the execution of mechanical machining operations. The machine tool M is preferably of the highly automated type, wherein an anthropomorphic robot is dedicated to loading the workpieces P to be machined and to unloading the machined workpieces P.

It should be emphasized that the machine tool M is usefully provided with a plurality of devices 1, which are arranged in appropriate positions and quantities according to the conformation of the workpiece P and to the type of mechanical machining operations to be performed.

Only one device 1 will be referred to in the figures and in the remainder of this disclosure for simplicity, unless otherwise stated.

The device 1 comprises at least one basic body 2 fixable to the machine tool M, e.g. to its worktop L, its bedplate, or any other part thereof.

The basic body 2 is provided with a fluid-operated cylinder 3, 4, 5 containing a fluid under pressure.

In the context of the present disclosure, a fluid under pressure is defined as any fluid in the liquid (and therefore ideally incompressible) or gaseous (and therefore compressible) state used as a carrier medium for the transport of energy in a hydraulic or pneumatic circuit; preferably the fluid under pressure consists of a conventional mineral oil but alternative embodiments cannot be ruled out wherein it may be synthetic oil, vegetable oil, water, air or the like.

Since the device 1 has several parts in contact with the fluid under pressure, special seals are provided arranged at different points of the device 1 which, for simplicity of representation, have been commonly identified by reference numeral 21.

The fluid-operated cylinder 3, 4, 5 is defined, e.g., by a main block 3 provided with a transit hole 6, a hollow liner 4 extending from the main block 3 and a bottom plate 5 associated with the hollow liner 4 on the opposite side from the main block 3.

The hollow liner 4 is made, e.g., in one monolithic body with the basic body 2, while the bottom plate 5 is made in one or more separate bodies which are associated with the hollow liner 4 by means of screws 35 or other fastening means.

The bottom plate 5 has a cavity 11 that ends up in a transit opening 22 aligned with the transit hole 6 and arranged on the opposite side therefrom.

The device 1 also comprises at least one stem 8, 9, 10 extending along a main axis A and is partly inserted into the fluid-operated cylinder 3, 4, 5 in a sliding manner along the main axis A by thrust of the hydraulic fluid under pressure.

The stem 8, 9, 10 comprises at least one intermediate portion 8, arranged inside the fluid-operated cylinder 3, 4, 5, and a first end portion 9, extending out of said fluid-operated cylinder 3, 4, 5.

In more detail, the first end portion 9 exits through the transit hole 6.

The intermediate portion 8 is shaped to define a driving piston 23, i.e., a part with a thickened section that runs to size on the inner walls of the fluid-operated cylinder 3, 4, 5 and divides it into two opposite chambers; the pressure supply of the fluid under pressure alternately in the two chambers allows the stem 8, 9, 10 to slide in one direction or in the opposite direction along the main axis A.

In the proximity of the bottom plate 5 the intermediate portion 8 is shaped to define a guiding stretch 7 inserted into the cavity 11.

Both the guiding stretch 7 and the cavity 11 extend along the main axis A, and during the motion of the stem 8, 9, 10 along the main axis A, the guiding stretch 7 always remains inserted at least partly into the cavity 11.

On the opposite side from the first end portion 9, the stem 8, 9, 10 also comprises at least a second end portion 10 extending out of the fluid-operated cylinder 3, 4, 5.

Specifically, the second end portion 10 extends out of the fluid-operated cylinder 3, 4, 5 through the transit opening 22 made in the bottom plate 5.

In actual facts, the second end portion 10 extends cantilevered out of the guiding stretch 7 and in alignment with the main axis A.

The operation and utility of the second end portion 10 will be described later in this disclosure.

Advantageously, roto-translation means 14, 15, 16 are positioned between the fluid-operated cylinder 3, 4, 5 and the stem 8, 9, 10, which roto-translation means are adapted to split the motion of the stem 8, 9, 10 into:

at least a first roto-translation stretch 12, wherein the stem 8, 9, 10 slides along the main axis A and rotates around the main axis A for a predetermined angle of rotation α; and at least a second translation stretch 13, wherein the stem 8, 9, 10 slides along the main axis A without rotating.

The predetermined angle of rotation α is preferably equal to 90°, but alternative embodiments wherein such an angle is different cannot be ruled out either.

The roto-translation means 14, 15, 16 comprise:

at least one groove 14 formed on at least one of either the fluid-operated cylinder 3, 4, 5 or the stem 8, 9, 10 and having a first section 17 substantially helical and a second section 18 substantially straight which extends parallel to the main axis A; and at least one engagement element 15 mounted on the other of either the fluid-operated cylinder 3, 4, 5 or the stem 8, 9, 10 and inserted inside the groove 14 in a sliding manner.

The sliding of the engagement element 15 along the first section 17 causes the motion of the stem 8, 9, 10 along the first stretch 12 and the sliding of the engagement element 15 along the second section 18 causes the motion of the stem 8, 9, 10 along the second stretch 13.

In the particular embodiment of the invention shown in the figures, the groove 14 is advantageously cut on the outer surface of the guiding stretch 7 while the engagement element 15 is mounted on the bottom plate 5 so that it protrudes inside the cavity 11.

Even more in detail, in the particular embodiment of the invention shown in the figures, the roto-translation means 14, 15, 16 comprise two grooves 14, cut on opposite surfaces of the guiding stretch 7, and two engagement elements 15, mounted on opposite surfaces of the cavity 11, so as to ensure greater stability and precision during the start-up of the stem 8, 9, 10.

High precision in the movement of the stem 8, 9, 10 is also given by the fact that the roto-translation means 14, 15, 16 comprise elastic offset means 16 adapted to push the engagement elements 15 inside the grooves 14.

The elastic offset means 16, in practice, ensure that the sliding of the engagement elements 15 in the corresponding grooves 14 always occurs with the highest precision, even when the contacting surfaces begin to experience wear; in other words, the elastic offset means 16 allow for backlash and wear offset between the grooves 14 and the engagement elements 15.

The elastic offset means 16 consist, e.g., of one or more disc springs housed inside the bottom plate 5 and arranged so as to impart on the engagement elements 15 a force directed along a direction orthogonal to the main axis A.

In this regard, it should be noted that a retaining ring 33 is mounted on the stem 8, 9, 10 for the lateral restraint of the disc springs 16, and a set of pads 34 positioned in the radial direction between the retaining ring 33 and the disc springs 16.

The pads 34 have the function of calibrating the preload of the disc springs 16 and, in addition, operate as end-of-stroke for the engagement elements 15 to protect the soundness of the disc springs 16.

The device 1 also comprises at least one clamping bracket 19, 20 associated with the first end portion 9 of the stem 8, 9, 10 for clamping the workpiece P to be machined on the machine tool M.

The clamping bracket 19, 20 comprises:

a proximal portion 19, which is attached to the first end portion 9 of the stem 8, 9, 10, e.g. by means of a fastening ring nut 24; and a distal portion 20, which extends cantilevered from the proximal portion 19 along a direction of work B substantially transverse, preferably orthogonal, to the main axis A and which is adapted to contact the workpiece P.

The clamping bracket 19, 20 is movable between:

a home position, wherein the clamping bracket 19, 20 is spaced apart from the basic body 2 and, therefore, from the worktop L; and a work position, wherein the clamping bracket 19, 20 is moved close to the basic body 2 for clamping the workpiece P.

In the particular embodiment shown in the figures wherein, as mentioned, the device 1 advantageously also comprises the roto-translation means 14, 15, 16, the clamping bracket 19, 20 is of the roto-translation type and comprises an intermediate position arranged between the home position and the work position. Compared with the home position (shown in FIG. 3), in the intermediate position (shown in FIG. 4) the clamping bracket 19, 20 is rotated and moved close to the basic body 2 as a result of the motion of the stem 8, 9, 10 along the first stretch 12, while in the work position (shown in FIG. 5) the clamping bracket 19, 20 is further moved close to the basic body 2 with respect to the intermediate position as a result of the motion of the stem 8, 9, 10 along the second stretch 13.

Alternative embodiment solutions cannot, however, be ruled out wherein the roto-translation means 14, 15, 16 are not provided and the clamping bracket 19, 20 is movable between the home position and the work position without rotating.

It should also be noted that in the particular embodiment shown in the figures, the basic body 2 of the device 1 is arranged so that the main axis A turns out to be substantially vertical, with the workpiece P being arranged above the worktop L and having an upward-facing surface on which the clamping bracket 19, 20 rests in the work position.

In this arrangement, the first volume V1 is arranged above the worktop L while the second volume V2 is arranged below the worktop L.

For simplicity of description, in the remainder of this disclosure, reference will be made to the arrangement of the device 1 shown in the figures, and, therefore, terms such as "top", "bottom", "above", "below", "to raise", "to lower" and others related thereto are to be understood with reference to what is shown in the figures. It is easy to understand, however, that the device 1 can be attached to the machine tool M with the main axis A oriented differently (such as e.g. horizontally or obliquely), depending on how the workpiece P to be clamped is shaped and arranged.

The device 1 comprises at least a first control assembly 25 adapted to control the attainment of the work position by the clamping bracket 19, 20.

The first control assembly 25 comprises:

at least a first probe element 26, 27 associated with the first end portion 9 of the stem 8, 9, 10; and at least a first contact sensor 28 associated with the basic body 2 and adapted to detect the contact with the first probe element 26, 27 when the work position is reached.

In more detail, the first probe element 26, 27 e.g. comprises:

an auxiliary bracket 26, extending cantilevered from the first end portion 9 along a direction D1 substantially transverse, preferably orthogonal, to the main axis A; and a probe pin 27, which is associated with the auxiliary bracket 26, extends along a direction substantially parallel to the main axis A and is adapted to make contact with the first contact sensor 28 when the work position is reached.

It should be noted that the auxiliary bracket 26 is fastened to the first end portion 9 of the stem 8, 9, 10 by the interposition of the clamping bracket 19, 20; more specifically, the auxiliary bracket 26 is connected, via the removable connecting means 29, such as e.g. of the type of screws, bolts or the like to the clamping bracket 19, 20, which in turn is attached to the first end portion 9.

The first contact sensor 28, on the other hand, advantageously comprises a first slider which is mounted on the basic body 2 in a sliding manner along a direction substantially parallel to the main axis A and which is connected to a first sensing line 30 in which a sensing fluid flows.

The first sensing line 30 is at least partly formed in the basic body 2 and is connected to a control system in a fluid-operated manner, which control system is adapted to authorize the machining of the workpiece P when the sensing fluid pressure exceeds or falls under a threshold value.

The control system, not shown in the figures, consists, e.g., of a control unit (electronic, hydraulic, or a combination of both) that manages the operation of the machine tool M.

In practice, when the clamping bracket 19, 20 moves along the main axis A to reach the clamping position, the first probe element 26, 27 makes contact and pushes the first slider 28 to slide parallel to the main axis A; this changes the pressure of the sensing fluid in the first sensing line 30 and provides the control system with the information that the device 1 has correctly and smoothly reached the clamping position.

Figure 5:
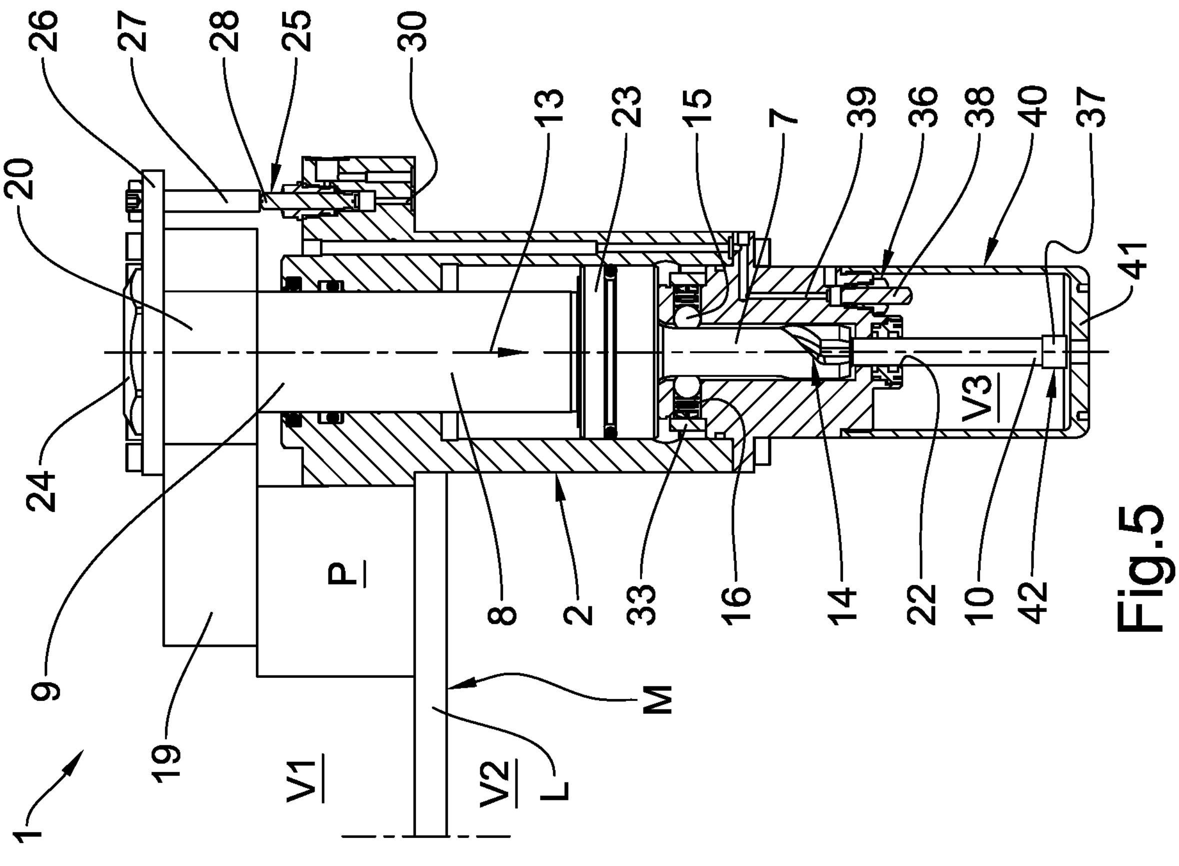
FIG. 5 is a side, partly sectional, view of the device according to the invention in the working position.

In this circumstance, which is shown in FIG. 5, the control system consents to the execution of mechanical machining operations by the tools of the machine tool M.

If this is not the case, that is, if the first slider 28 is not pressed by the first probe element 26, 27, then the control system learns that the clamping bracket 19, 20 has not reached the clamping position (for example, because the clamping phase of the workpiece P has not finished yet or because of incorrect placement of the workpiece P on the machine tool M) and does not authorize the start of the mechanical machining operations.

The lack of authorization safeguards the workpiece P and the machine tool M by preventing potentially dangerous operations to the soundness of the same.

In response to the lack of authorization, protocols aimed at restoring normal working conditions can be activated, such as e.g. repositioning the workpiece P and/or having an operator intervene.

The device 1 comprises at least a second control assembly 36 adapted to monitor the attainment of the home position.

The second control assembly 36 comprises:

at least a second probe element 42 associated with the second end portion 10 of the stem 8, 9, 10; and at least a second contact sensor 38 associated with the basic body 2 and adapted to detect the contact with the second probe element 42 when the home position is reached.

In more detail, it is specified that the second probe element 42 comprises at least one probe bracket, which extends cantilevered from the second end portion 10 along a direction D2 substantially transverse, preferably orthogonal, to the main axis A and which is adapted to make contact with the second contact sensor 38 when the home position is attained.

The second contact sensor 38, on the other hand, advantageously comprises a second slider which is mounted on the basic body 2 in a sliding manner along a direction substantially parallel to the main axis A and that is connected to a second sensing line 39 wherein a sensing fluid flows.

The second sensing line 39 is at least partly formed into the basic body 2 and is connected in a fluid-operated manner to a control system adapted to authorize the picking of the workpiece P from the machine M when the sensing fluid pressure exceeds or falls under a threshold value.

The control system intended to authorize the picking of the workpiece P may usefully coincide with the control system intended to authorize the machining of the workpiece P and consist, e.g., of the control unit that manages the operation of the machine tool M.

In practice, when the clamping bracket 19, 20 moves along the main axis A to reach the home position, the second probe element 42 makes contact and pushes the second slider 38 to slide parallel to the main axis A; this changes the pressure of the sensing fluid in the second sensing line 39 and provides the control system with the information that the device 1 has correctly and smoothly reached the home position.

Figure 3:
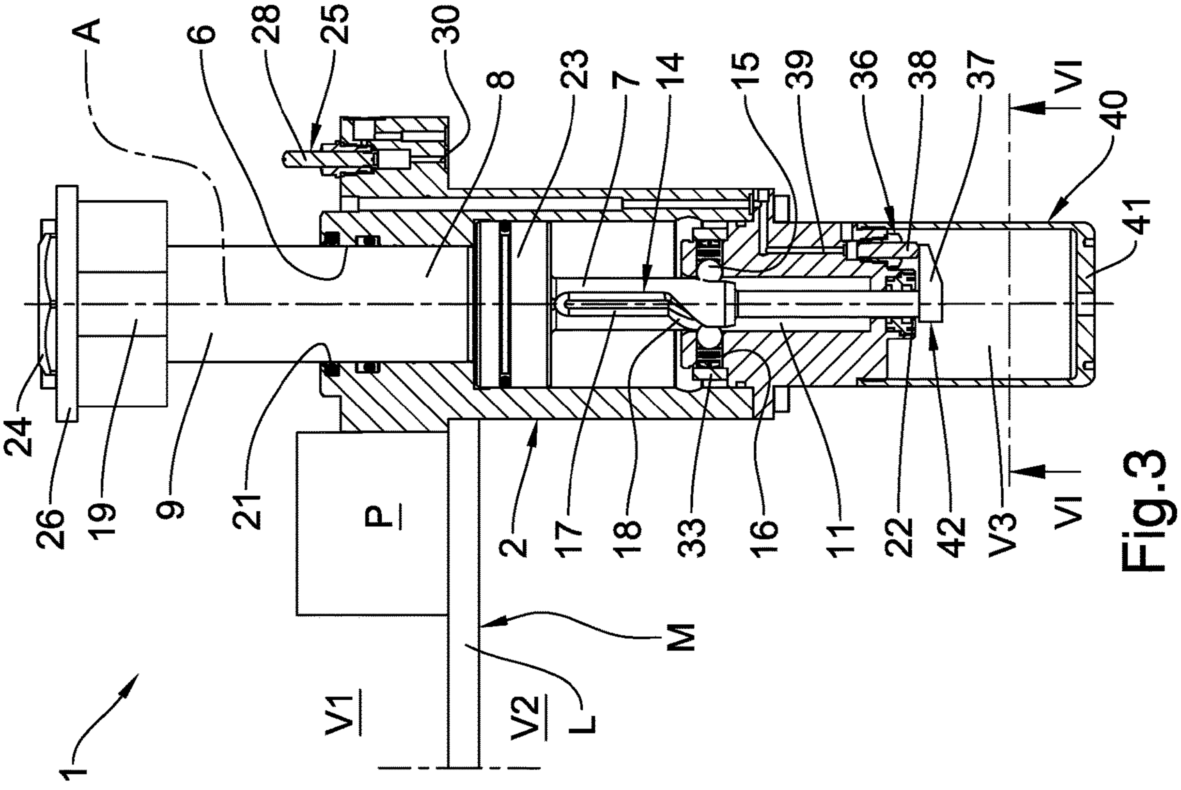
FIG. 3 is a side, partly sectional, view of the device according to the invention in a home position.

In this circumstance, which is shown in FIG. 3, the control system consents to the activation of the robot to pick up the workpiece P.

If this is not the case, i.e., if the second slider 38 is not pressed by the second probe element 42, then the control system learns that the clamping bracket 19, 20 has not reached the home position (e.g., because the release phase of the workpiece P has not finished yet or because of an unwanted collision between the clamping bracket 19, 20 and other parts of the machine tool M or of the workpiece P) and does not authorize the robot to start the picking operation.

Again, the lack of authorization safeguards the workpiece P and the machine tool M by preventing potentially dangerous operations to the soundness of the same, and in response to the lack of authorization, protocols aimed at restoring the normal working conditions can be activated, such as the intervention of an operator to check for any obstructions or collisions that may have occurred on the clamping bracket 19, 20.

It is emphasized that the special expedient of providing a probe bracket 37 with an elongated conformation extending along the direction D2 allows the second probe element 42 to make contact with the second contact sensor 38 only if the clamping bracket 19, 20 and the stem 8, 9, 10 have successfully completed the roto-translation path to return to the home position and, therefore, have not only translated along the main axis A but have also rotated by the predetermined rotation angle α.

In this regard, it should be noted that in the event that accidents occur during the release of the workpiece P caused by the unwanted collision of the clamping bracket 19, 20 with other parts of the machine tool M or of the workpiece P, the clamping bracket 19, 20 may find itself impeded in rotation but free in translation, i.e., it may make contact with an obstacle that does not allow it to rotate but only to slide along the main axis A.

In such a case study, the force produced by the fluid under pressure may be so great that it breaks the roto-translation means 14, 15, 16 and causes the clamping bracket 19, 20 and the stem 8, 9, 10 to rise without letting them to perform their intended rotation around the predetermined angle of rotation α.

In the absence of this rotation, the probe bracket 37 does not rotate either and, therefore, is not advantageously able to reach and make contact with the second contact sensor 38 and the control system does not authorize the picking up of the workpiece P, so that greater damage, for example to the machine tool M or to the workpiece handling robot, is avoided.

It should be emphasized that other types of second probe elements 42, such as could be, e.g., a plate of enlarged conformation that does not extend along the direction D2 but rather over an entire horizontal plane, would not be able to ensure the reliable operation of the probe bracket 37 because, in the case described above, they would make contact with the second contact sensor 38 even if the rotation around the predetermined angle of rotation α has not been completed.

The first contact sensor 28 and the second contact sensor 38 are substantially arranged on the same lying plane G passing through the main axis A.

This advantageously allows the sensing lines 30, 39 to be arranged on the same side as the basic body 2 and allow them to be more easily connected to the control system.

Figure 6:
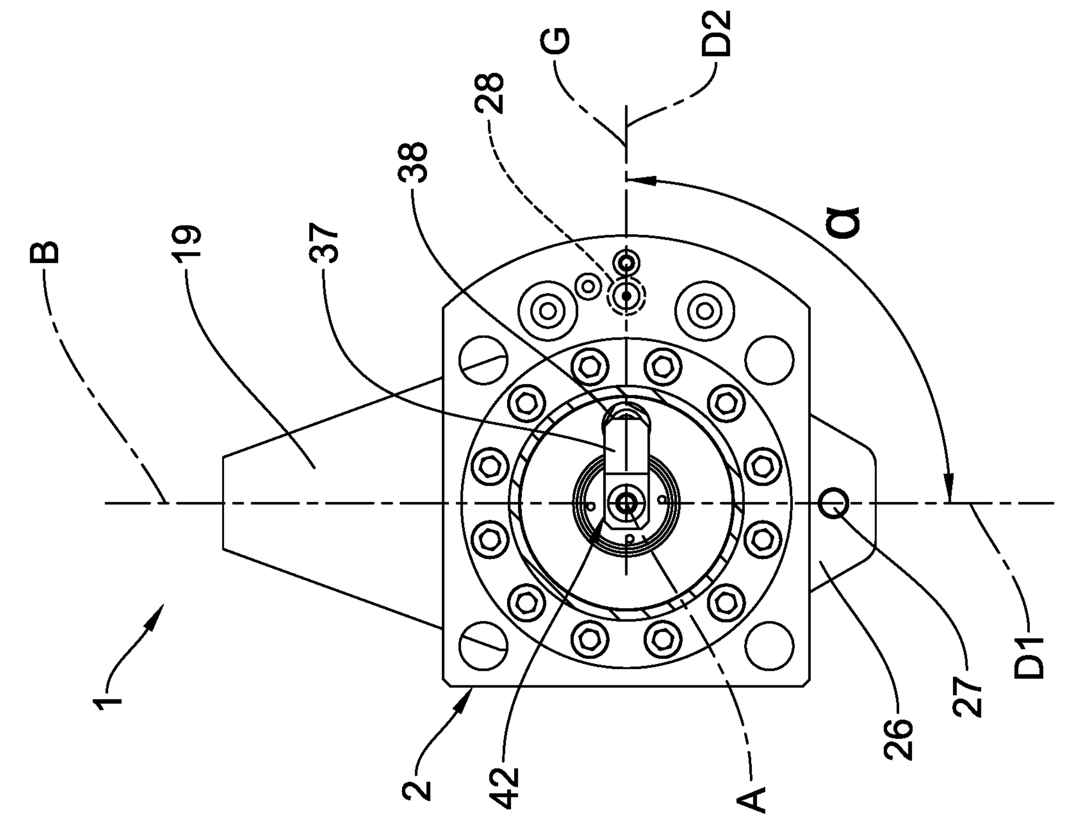
FIG. 6 is a sectional view of the device according to the invention along the VI-VI plane in FIG. 3.

The auxiliary bracket 26 and the probe bracket 37 extend along directions D1 and D2 substantially transverse, preferably orthogonal, to the main axis A and staggered from each other by an angle substantially equal to the predetermined angle of rotation α (see FIG. 6).

It should be noted that in the home position, the direction D2 of the probe bracket 37 lies in the lying plane G, while the direction D1 of the auxiliary bracket 26 is rotated with respect to the lying plane G by an angle equal to the predetermined angle of rotation α; in the work position, on the other hand, it is the direction D1 of the auxiliary bracket 26 that lies in the lying plane G while the direction D2 of the probe bracket 37 is rotated with respect to the lying plane G by an angle equal to the predetermined angle of rotation α.

Conveniently, the device 1 comprises a covering and protective casing 40, which is associated with the basic body 2 and is adapted to cover and protect the second control assembly 36.

The covering and protective casing 40 comprises a cup-shaped element 41 defining an internal volume V3 inside which the second probe element 42 is movable.

In this way, the second probe element 42 and the second contact sensor 38 remain in a substantially separate and protected environment from the rest of the machine tool M.

In particular, it can be noted that, in the particular arrangement of the device 1 shown in the figures, the hollow liner 4 and the bottom plate 5 are housed inside the second volume V2 which, as mentioned above, represents the area inside the machine tool M that is generally inaccessible during the execution of the mechanical machining operations and which, for that reason, is more subject to accumulation of condensation, dirt, rust and other erosive agents.

Thanks to the presence of the covering and protective casing 40, the second probe element 42 and the second contact sensor 38 remain clean and protected, and damage to them is avoided that could prevent the proper operation of the device 1.

The operation of this invention is as follows.

The workpiece P is placed on the worktop L with the clamping bracket 19, 20 arranged in the home position.

In the home position, in practice, the clamping bracket 19, 20 leaves an area of the worktop L clear to allow the positioning of the workpiece P on the machine tool M.

In this circumstance, the probe bracket 37 makes contact against the second slider 38, thus allowing the control system to verify whether the clamping bracket 19, 20 is actually in the home position and to authorize activation of the robot for the necessary gripping and handling operations of the workpiece P above the worktop L (FIG. 3).

Following the supply of the hydraulic fluid under pressure inside the fluid-operated cylinder 3, 4, 5, the stem 8, 9, 10 slides inside the basic body 2 along the first stretch 12 and the clamping bracket 19, 20 moves from the home position to the intermediate position.

Figure 4:
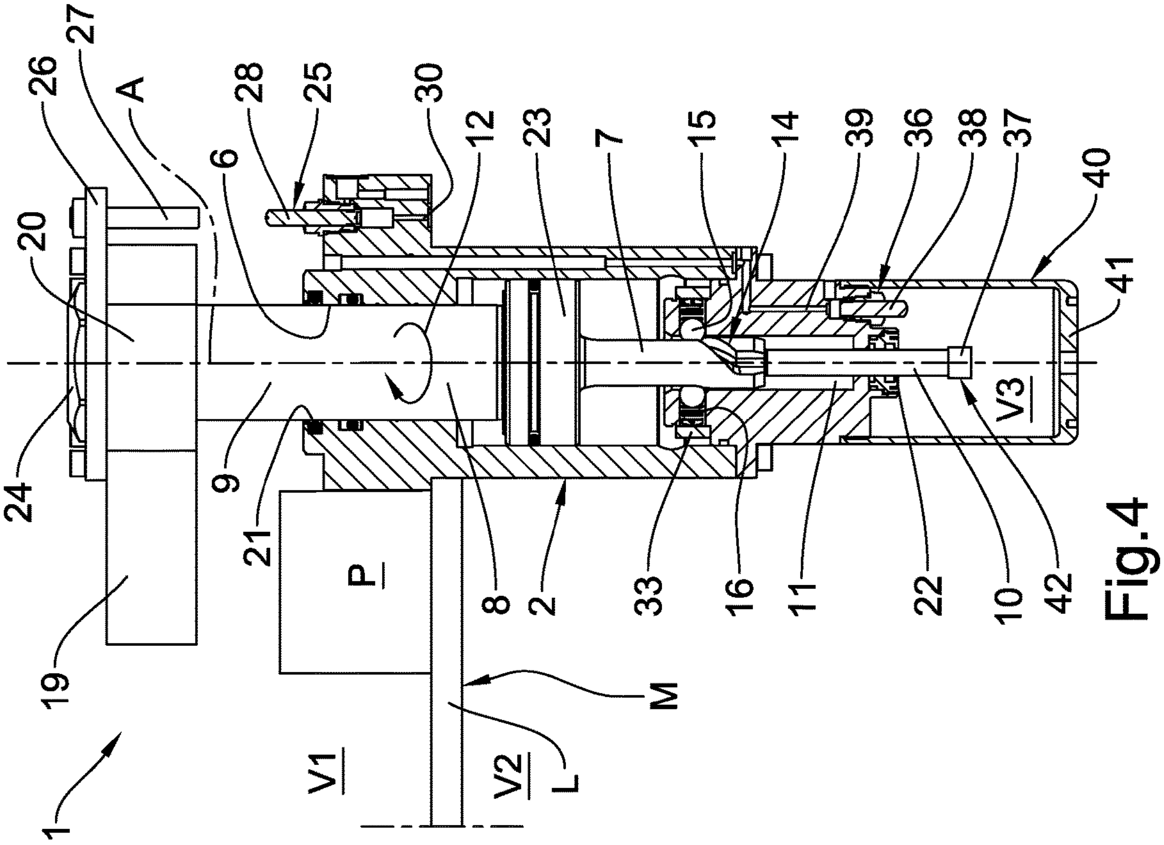
FIG. 4 is a side, partly sectional, view of the device according to the invention in the intermediate position.

In the intermediate position, the clamping bracket 19, 20 is rotated with respect to the home position and is placed with the distal portion 20 overhanging the workpiece P (FIG. 4).

Once the intermediate position is reached, the supply of the hydraulic fluid under pressure inside the fluid-operated cylinder 3, 4, 5 continues, and the stem 8, 9, 10 slides inside the basic body 2 along the second stretch 13.

During the motion of the stem 8, 9, 10 along the second stretch 13, the clamping bracket 19, 20 moves from the intermediate position to the work position wherein the distal portion 20 rests on the workpiece P by clamping it on the machine tool M.

In this circumstance, the first probe element 26, 27 makes contact against the first slider 28, thus allowing the control system to verify whether the clamping bracket 19, 20 is actually in the clamping position and to consent to the execution of the mechanical machining operations by the tools of the machine tool M (FIG. 5).

The invention claimed is:

1. A device for clamping workpieces on machine tools, comprising:

at least one basic body fixable to a machine tool and provided with a fluid-operated cylinder containing a fluid under pressure;

at least one stem extending along a main axis and is partly inserted into said fluid-operated cylinder in a sliding manner along said main axis by thrust of said fluid under pressure, said stem comprising at least one intermediate portion arranged inside said fluid-operated cylinder and a first end portion extending out of said fluid-operated cylinder;

at least one clamping bracket associated with said first end portion of the stem for clamping a workpiece to be machined on said machine tool, said clamping bracket being movable at least between:

a home position, wherein said clamping bracket is spaced apart from said basic body; and a work position, wherein said clamping bracket is moved close to said basic body for clamping said workpiece;

at least a first control assembly for controlling the attainment of said work position, comprising:

at least a first probe element associated with said first end portion of said stem; and at least a first contact sensor associated with said basic body and adapted to detect the contact with said first probe element in said work position;

wherein said stem comprises at least a second end portion extending out of said fluid-operated cylinder on an opposite side with respect to said first end portion, and wherein said device comprises at least a second control assembly for controlling the attainment of said home position, comprising:

at least a second probe element associated with said second end portion of said stem; and at least a second contact sensor associated with said basic body and adapted to detect the contact with said second probe element in said home position;

wherein said second probe element comprises at least one probe bracket extending cantilevered from said second end portion along a direction substantially transverse to said main axis and adapted to come into contact with said second contact sensor in said home position.

2. The device according to claim 1, further comprising a covering and protective casing of said second control assembly, which is associated with said basic body.

3. The device according to claim 2, wherein said covering and protective casing comprises a cup-shaped element defining an internal volume-, said second probe element being movable inside said internal volume.

4. The device according to claim 1, wherein said first probe element comprises:

an auxiliary bracket, extending cantilevered from said first end portion along a direction substantially transverse to said main axis; and a probe pin associated with said auxiliary bracket, extending along a direction substantially parallel to said main axis and is-adapted to come into contact with said first contact sensor in said work position.

5. The device according to claim 1, further comprising roto-translation means positioned between said fluid-operated cylinder and said stem and adapted to split the motion of said stem into:

at least a first roto-translation stretch, wherein said stem slides along said main axis and rotates around said main axis for a predetermined angle of rotation; and at least a second translation stretch, wherein said stem slides along said main axis without rotating.

6. The device according to claim 5, wherein said roto-translation means comprise:

at least one groove formed on at least one of either said stem or said fluid-operated cylinder and having a first section substantially helical and a second section substantially straight; and at least one engagement element mounted on the other of either said stem or said fluid-operated cylinder and inserted inside said groove in a sliding manner;

the sliding of said engagement element along said first section causing the motion of said stem along said first stretch and the sliding of said engagement element along said second section thus causing the motion of said stem along said second stretch.

7. The device according to claim 6, wherein said roto-translation means comprise elastic offset means adapted to push said engagement element inside said groove.

8. The device according to claim 5, wherein said clamping bracket comprises an intermediate position, wherein said clamping bracket is rotated and moved close to said basic body with respect to said home position as a result of the motion of said stem along said first stretch, in said work position said clamping bracket being further moved close to said basic body with respect to said intermediate position as a result of the motion of said stem along said second stretch.

9. The device according to claim 4, wherein said first contact sensor and said second contact sensor are substantially arranged on the same lying plane passing through said main axis, and wherein said auxiliary bracket and said probe bracket extend along the directions substantially transverse to said main axis and staggered from each other by an angle substantially equal to a predetermined angle of rotation.

10. A device for clamping workpieces on machine tools, comprising:

at least one basic body fixable to a machine tool and provided with a fluid-operated cylinder containing a fluid under pressure;

at least one stem extending along a main axis and is partly inserted into said fluid-operated cylinder in a sliding manner along said main axis by thrust of said fluid under pressure, said stem comprising at least one intermediate portion arranged inside said fluid-operated cylinder and a first end portion extending out of said fluid-operated cylinder;

at least one clamping bracket associated with said first end portion of the stem for clamping a workpiece to be machined on said machine tool, said clamping bracket being movable at least between:

a home position, wherein said clamping bracket is spaced apart from said basic body; and a work position, wherein said clamping bracket is moved close to said basic body for clamping said workpiece;

at least a first control assembly for controlling the attainment of said work position, comprising:

at least a first probe element associated with said first end portion of said stem; and at least a first contact sensor associated with said basic body and adapted to detect the contact with said first probe element in said work position;

wherein said stem comprises at least a second end portion extending out of said fluid-operated cylinder on an opposite side with respect to said first end portion, and wherein said device comprises at least a second control assembly for controlling the attainment of said home position, comprising:

at least a second probe element associated with said second end portion of said stem; and at least a second contact sensor associated with said basic body and adapted to detect the contact with said second probe element in said home position;

wherein said first probe element comprises:

an auxiliary bracket extending cantilevered from said first end portion along a direction substantially transverse to said main axis; and a probe pin associated with said auxiliary bracket, extending along a direction substantially parallel to said main axis and adapted to come into contact with said first contact sensor in said work position.

11. The device according to claim 10, further comprising a covering and protective casing of said second control assembly, which is associated with said basic body.

12. The device according to claim 11, wherein said covering and protective casing comprises a cup-shaped element defining an internal volume, said second probe element being movable inside said internal volume.

13. The device according to claim 10, wherein said second probe element comprises at least one probe bracket extending cantilevered from said second end portion along a direction substantially transverse to said main axis and adapted to come into contact with said second contact sensor in said home position.

14. The device according to claim 10, further comprising roto-translation means positioned between said fluid-operated cylinder and said stem and adapted to split the motion of said stem into:

at least a first roto-translation stretch, wherein said stem slides along said main axis and rotates around said main axis for a predetermined angle of rotation; and at least a second translation stretch, wherein said stem slides along said main axis without rotating.

15. The device according to claim 14, wherein said roto-translation means comprise:

at least one groove formed on at least one of either said stem or said fluid-operated cylinder and having a first section substantially helical and a second section substantially straight; and at least one engagement element mounted on the other of either said stem or said fluid-operated cylinder and inserted inside said groove in a sliding manner;

the sliding of said engagement element along said first section causing the motion of said stem along said first stretch and the sliding of said engagement element along said second section thus causing the motion of said stem along said second stretch.

16. The device according to claim 15, wherein said roto-translation means further comprise elastic offset means adapted to push said engagement element inside said groove.

17. The device according to claim 14, wherein said clamping bracket comprises an intermediate position, wherein said clamping bracket is rotated and moved close to said basic body with respect to said home position as a result of the motion of said stem along said first stretch, and in said work position said clamping bracket is further moved close to said basic body with respect to said intermediate position as a result of the motion of said stem along said second stretch.

18. The device according to claim 13, wherein said first contact sensor and said second contact sensor are substantially arranged on the same lying plane passing through said main axis, and wherein said auxiliary bracket and said probe bracket extend along the directions substantially transverse to said main axis and staggered from each other by an angle substantially equal to a predetermined angle of rotation.

* * * * *